UNITED STATES PATENT OFFICE.

HEMKE BERCKENHOFF, OF HILVERSUM, NETHERLANDS.

CYLINDRICAL OR SLEEVE VALVE.

1,377,798. Specification of Letters Patent. Patented May 10, 1921.

Application filed December 22, 1920. Serial No. 432,568.

*To all whom it may concern:*

Be it known that I, HEMKE BERCKENHOFF, subject of the Netherlands, and resident of Hilversum, in the county of Noordholland, Netherlands, have invented certain new and useful Improvements in Cylindrical or Sleeve Valves, of which the following is a specification.

This invention relates to improvements in cylindrical or sleeve valves, usually used with internal combustion engines, but which valve can also be applied to steam engines.

Objects of the invention are to provide for the various advantages of concentric sleeve valves, viz: large maximum opening for long time intervals with very short strokes, providing a noiseless gas distributing system, and to avoid the defects embodied in the hitherto known constructions.

In my invention one of the advantages obtained is that one of the valves may be employed as a cylinder-lining, permitting a cheap valve construction, a great desideratum since more and more aluminium cylinder bodies are being adopted, which bodies require a cast iron or steel inner lining.

Some of the advantages attained with constructions embodying the invention are as follows: large valves having an approximate valve diameter of the size of the diameter of the cylinder, permitting a short stroke, a rapid opening and closing of the ports whereby their maximum opening for long time intervals and a noiseless movement of the valve is obtained.

Another advantage is that owing to the fact that the cylinder during the compression and working stroke is kept closed by one valve only, the chance of leakage is decreased and the cooling of the seats is more easily accomplished.

A further advantage is that as both valves are about equally balanced, they are easily moved against the pressure of the exhaust gases.

Where aluminium cylinders are used a cheap valve construction is obtained, as one of the valves may be used in place of the cast iron or steel lining.

The invention furthermore has still the following advantages, not contained in the previous constructions:—

When employing one of the valves as a cylinder lining no separate packing is required in the pressure chamber, and the construction provides a movable seat against which either one or both valves can shut off, thereby insuring a perfect seal in the pressure chamber.

In the accompanying drawing, Figures 1 to 7, inclusive, show different embodiments of my invention. In each view the sleeve valves are indicated by the numerals 1 and 2 and the seating member by the numeral 3.

Figure 1:
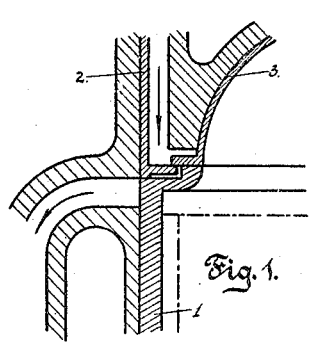

In Fig. 1 the stationary seat 3 is situated at one side of the seating surfaces, so that the valves open in the same direction in this case toward the crank shaft. Both valves shut off upon each other as well as upon the stationary seat. In order to insure a good closing, the seat 3, which is not actuated, is somewhat movably arranged, by locating it partly spherically within the cylinder head. This enables the stationary seat 3, in case the cylindrical sleeve-valve should take a little inclined position, which to a certain extent cannot be avoided, owing to the necessary play and the lateral pressure of the piston, to rock and take a corresponding position. The control of the inlet and exhaust is effected in such a way, that first both valves and afterward one separately is actuated and reversed. It is obvious that in this construction all advantages are combined and the necessary packing of one valve coincides with that of the piston. In this form of the invention the valve 1 can be arranged around the cylinder wall, in which the water-jacket also can be provided (shown in dotted lines) though this arrangement may also be applied to each of the modified forms.

Figure 2:
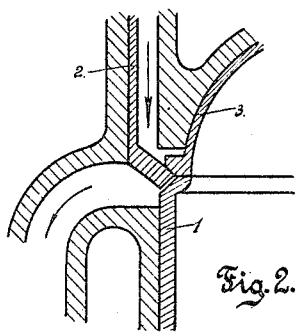
Figure 3:
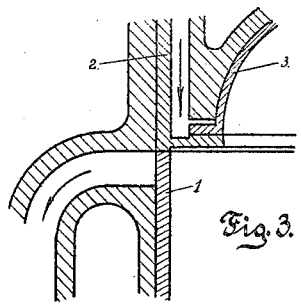
Figure 4:
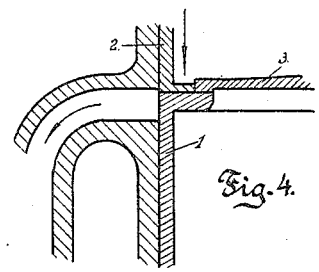

In Fig. 2 the sleeve valves 1 and 2 are free from each other while both bear upon the seat 3, in Fig. 3 the valves do touch and abut each other, while only one, however, that is the valve 2, bears upon the seat 3. In Fig. 4 is shown a slide like shutting off of the valve 2 upon the seat 3, though sleeves 1 and 2 again abut each other.

Figure 5:
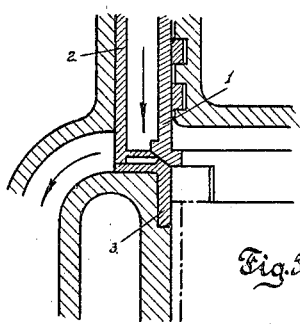
Figure 6:
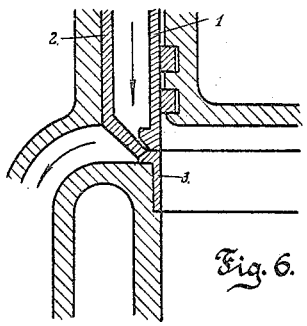
Figure 7:
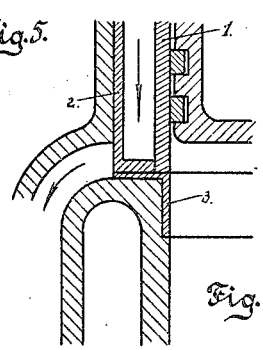

In Figs. 5 and 6 further forms are illustrated, in which only one valve is adapted to shut and complete the cylinder. In these forms, the valves open in a direction away from the crank shaft. In Fig. 5 both valves touch each other, while both also bear upon the cylinder wall or the stationary seat 3 thereon. In Fig. 6 the valves are free from each other, but both bear again upon the cylinder wall or the stationary seat member thereof. In Fig. 7 the valves themselves shut off upon each other in a slidelike manner. In all these embodiments (Figs. 5, 6 and 7) however, a separate packing in the cylinder head is necessary.

I claim as my invention:

1. In an engine having a piston, the combination of a plurality of sliding sleeve valves controlling the inlet and exhaust fluid, which valves coöperate in abutting contact with each other, and a relatively fixed seating member upon which one of said valves seats to form a pressure chamber which is defined by said valve, the piston and fixed elements.

2. In an engine having a piston and a crank shaft, the combination of a plurality of sleeve valves controlling the inlet and exhaust fluid, which valves in opening slide toward the crank shaft and coöperate in abutting contact with each other, and a relatively fixed seating member upon which one of said valves seats to form a pressure chamber which is defined by said valve, the piston and fixed elements.

3. In a piston engine having a plurality of sliding sleeve valves, a rockable seat member concentrically located in the cylinder against which one of the sleeve valves seats to complete the pressure chamber.

Signed at Amsterdam this 26th day of October, A. D. 1920.

HEMKE BERCKENHOFF.